PAYNE & CLEGHORN.
Stock Car.

No. 96,722.

Patented Nov. 9, 1869.

United States Patent Office.

EDWARD PAYNE AND J. D. CLEGHORN, OF CHICAGO, ILLINOIS.

*Letters Patent No. 96,722, dated November 9, 1869.*

IMPROVED RAILWAY CATTLE-CAR.

The Schedule referred to in these Letters Patent and making part of the same.

*To whom it may concern:*

Be it known that we, EDWARD PAYNE and J. D. CLEGHORN, British subjects temporarily residing in Chicago, county of Cook, and State of Illinois, have invented certain new and useful Improvements in Cattle or Stock-Cars; and we hereby declare the following to be a full, clear, and exact description of the same, reference being had to the accompanying drawings.

Our invention relates to the construction of railway-cars for the transportation of live stock, and is intended to provide means whereby, first, the cattle can be readily supplied with the necessary food and water, without removing them from the car; and secondly, they may be relieved of a portion of their weight, so that they may be kept for any length of time in a standing position, and at ease.

The invention consists—

First, in the combination, with one or more troughs, located upon the exterior of the car, of a series of movable slat-frames, which, when opened, afford ample space for the animals to feed, and, when closed, constitute what is generally known as a "slat-car."

Second, in the employment of a series of canvas, or other suitable slings, which are raised or lowered by means of windlasses, or equivalent mechanism, arranged in the top of the car, and are intended to pass around the animals, so as to partially sustain them, or relieve them, when in a standing posture, of a portion of their weight.

The nature of our invention, and the manner in which the same is or may be carried into effect, will be readily understood by reference to the drawings hereto annexed, in which—

Figure 1:
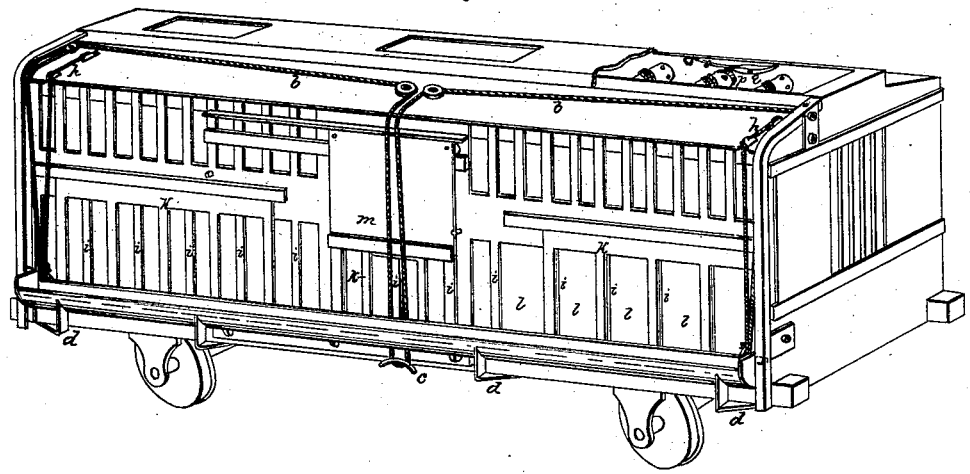
Figure 1 represents a perspective view of a car, made in accordance with our invention.

The feeding-troughs A, in this instance, are located upon the outside of the car.

Each trough is held to the side of the car by pins or rollers on its ends, which slide in ways $a$, arranged at the ends, and extending from the top to near the bottom of the car.

The trough is elevated by means of the ropes $b$, which pass over a system of pulleys, as shown in the drawing, and it is maintained in its elevated position by winding the ropes upon a cleat, $c$, or other suitable fastening-device.

The trough, when the ropes are loosened, drops, by reason of its own weight, and in its lowest position is supported upon brackets $d$, or any other supporting-device.

In order to make it easier to raise and lower the trough, we can employ weights to nearly counter-balance it; these weights, which are attached to the ends of ropes $h$, being enclosed by boxes, which, if required, can extend down below the bottom of the car.

It is manifest that the troughs can be arranged either within or without the car, and that the construction and arrangement of the devices for raising and lowering, as well as counterbalancing them, can be greatly varied.

It is convenient, however, in many respects, to place the troughs upon the exterior of the car, as the food and water for the stock can be placed in them more readily than if they were inside.

When the troughs are thus arranged, it is, however, necessary to provide means for allowing the cattle to feed; and to this end we place the stationary slats $i$, which are opposite the troughs, say twice the ordinary distance apart, and then we apply to these slats, either upon the exterior or interior of the car, but in this case upon the exterior, sliding slat-frames $k$, the distance between the slats of which is the same as that between the slats $i$.

When it is desired to permit the cattle to feed, the slat-frames can be pushed back, so that their slats will coincide with slats $i$, thus leaving large open spaces, $l$, through which the cattle can have access to the trough, as shown at the right-hand end of the car in fig. 1.

After the cattle have been fed, the frames can be pushed up again to bring their slats over the openings $l$, thus giving to the car the appearance of an ordinary slat-car.

For the same purpose, the sliding door $m$ has arranged in its lower part a sliding slat-frame.

For the purpose of relieving the animals of a portion of their weight, we provide a series of slings, $n$, of canvas, or other suitable material, and of the proper dimensions, say about four feet long by two or three feet wide, or such other dimensions as circumstances may require.

Each sling is connected with a small roller or windlass, $o$, supported between strong stanchions or beams, arranged in the top of and running the whole length of the car; and each windlass is provided with a cramp and check or ratchet and pawl, $p$ $q$, by which it can be held in the required position.

To connect the sling with the windlass, we prefer to attach to each end of the sling a strong bar of iron or wood, to which is attached two ropes, the sling being thus provided at the corners with ropes, the upper ends of which are drawn together and fitted with a ring for receiving a hook attached to the rope suspended from the roller or windlass.

Other arrangements of these devices, however, as well as other hoisting-mechanism can be employed, though we much prefer the arrangement we have just described.

The slings, it will be noticed, are independent of each other, and can be operated separately.

Figure 2:
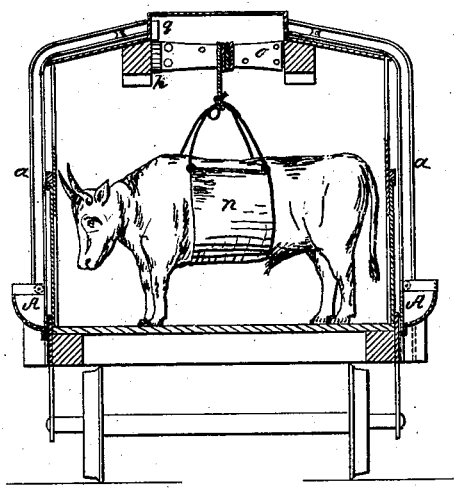
Figure 2 is a transverse vertical section of the same.

When the sling is placed around the body of the animal, as shown in fig. 2, the windlass can be turned by a handspike or other means, so as to wind the rope upon it, and raise the sling, which thus partially supports the weight of the animal, and enables it to maintain a standing posture with ease for any length of time.

Access may be had to the windlass through hatchways in the top of the car, as shown in fig. 1.

Having now described our invention, and the manner in which the same is or may be carried into effect,

What we claim, and desire to secure by Letters Patent, is—

1. The employment, in connection with a trough or troughs, located upon the exterior of the car, of sliding slat-frames, combined with the stationary slats of the car, for operation substantially as herein described and shown.

2. Providing a cattle or stock-car, with a series of independent slings for relieving the cattle of a portion of their weight, said slings being connected with windlasses, or equivalent elevating-apparatus, arranged in the upper part of the car, substantially as herein shown and specified.

In testimony whereof, we have signed our names to this specification, before two subscribing witnesses.

EDWD. PAYNE.
J. D. CLEGHORN.

Witnesses:
WILLIAM H. LONG,
EDWIN G. HAWLEY.